(12) United States Patent
Kirby

(10) Patent No.: US 10,894,448 B2
(45) Date of Patent: Jan. 19, 2021

(54) RUNFLAT TIRE WITH SIDEWALL-REINFORCING INSERTS

(71) Applicant: Bridgestone Americas Tire Operations, LLC, Nashville, TN (US)

(72) Inventor: James M. Kirby, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 171 days.

(21) Appl. No.: 15/549,296

(22) PCT Filed: Feb. 1, 2016

(86) PCT No.: PCT/US2016/015897
§ 371 (c)(1),
(2) Date: Aug. 7, 2017

(87) PCT Pub. No.: WO2016/130347
PCT Pub. Date: Aug. 18, 2016

(65) Prior Publication Data
US 2018/0037069 A1    Feb. 8, 2018

Related U.S. Application Data

(60) Provisional application No. 62/114,759, filed on Feb. 11, 2015.

(51) Int. Cl.
*B60C 17/00* (2006.01)
*B60C 9/12* (2006.01)

(52) U.S. Cl.
CPC ............ *B60C 17/0018* (2013.01); *B60C 9/12* (2013.01); *B60C 17/00* (2013.01); *B60C 17/0036* (2013.01)

(58) Field of Classification Search
CPC . B60C 17/00; B60C 17/0018; B60C 17/0009; B60C 17/08; B60C 2017/0072; B60C 17/0036
See application file for complete search history.

(56) References Cited

U.S. PATENT DOCUMENTS 3,464,477 A * 9/1969 Verdier ............... B60C 9/09
152/535
3,954,131 A * 5/1976 Hoshino ............. B60C 13/00
152/517

(Continued)

FOREIGN PATENT DOCUMENTS

CN        1265067 A    8/2000
CN        1107601 C    5/2003
(Continued)

OTHER PUBLICATIONS

English Translation of Menz Ruediger; EP 1982849 A1; Retrieved from Espacenet (Year: 2008).*

(Continued)

*Primary Examiner* — Robert C Dye
*Assistant Examiner* — Edgaredmanuel Troche

(57) ABSTRACT

A run-flat tire having a tread, an inner liner disposed beneath the tread, a body ply, and a pair of sidewalls axially spaced apart from one another is disclosed. The run-flat tire further includes a pair of sidewall-reinforcing portions each disposed in respective sidewall regions and each having a fabric barrier; a first sidewall-reinforcing insert between the fabric barrier and the inner liner; and a second sidewall-reinforcing insert disposed between the fabric barrier and the body ply. The fabric barrier extends not more than an entire length of the sidewall-reinforcing portion.

20 Claims, 3 Drawing Sheets

(56) References Cited

U.S. PATENT DOCUMENTS

| | | | |
|---|---|---|---|
| 4,287,924 A * | 9/1981 | Deck | B60C 7/12 |
| | | | 152/153 |
| 5,427,166 A | 6/1995 | Willard, Jr. | |
| 5,511,599 A | 4/1996 | Willard, Jr. | |
| 6,269,857 B1 * | 8/2001 | Kanai | B60C 15/0018 |
| | | | 152/517 |
| 6,338,374 B1 | 1/2002 | Nguyen et al. | |
| 6,439,283 B1 | 8/2002 | Paonessa et al. | |
| 6,488,797 B1 | 12/2002 | Kirby | |
| 6,679,306 B2 | 1/2004 | Steinke | |
| 6,712,108 B1 * | 3/2004 | Koeune | B60C 9/04 |
| | | | 152/516 |
| 6,763,866 B1 * | 7/2004 | Nguyen | B60C 17/0009 |
| | | | 152/516 |
| 6,814,120 B1 * | 11/2004 | Nguyen | B60C 17/0009 |
| | | | 152/517 |
| 6,843,293 B1 | 1/2005 | Corvasce et al. | |
| 6,988,522 B2 | 1/2006 | Colantonio et al. | |
| 7,093,633 B2 | 8/2006 | Dahlberg et al. | |
| 7,406,990 B2 | 8/2008 | Brown et al. | |
| 7,409,974 B2 | 8/2008 | Colantonio et al. | |
| 7,448,422 B2 | 11/2008 | Markoff et al. | |
| 7,703,493 B2 | 4/2010 | Willard, Jr. | |
| 7,900,672 B2 | 3/2011 | Baran | |
| 7,971,615 B2 * | 7/2011 | Neubauer | B29D 30/32 |
| | | | 152/539 |
| 8,205,652 B2 | 6/2012 | Koeune et al. | |
| 8,573,272 B2 * | 11/2013 | Schreurs | B60C 17/0009 |
| | | | 152/516 |
| 8,590,586 B2 | 11/2013 | Jiang | |
| 8,763,663 B2 | 7/2014 | Hottebart | |
| 2002/0062894 A1 | 5/2002 | Miner | |
| 2007/0006956 A1 | 1/2007 | Park et al. | |
| 2008/0142139 A1 | 6/2008 | Kraus et al. | |
| 2009/0139623 A1 | 6/2009 | Kaiser | |
| 2009/0277554 A1 | 11/2009 | Donckels | |
| 2013/0061997 A1 | 3/2013 | Cinget et al. | |

FOREIGN PATENT DOCUMENTS

| | | | | |
|---|---|---|---|---|
| CN | 1438944 | A | 8/2003 | |
| CN | 1900399 | A | 1/2007 | |
| CN | 101077683 | A | 11/2007 | |
| CN | 102216093 | A | 10/2011 | |
| CN | 101678716 | B | 11/2011 | |
| EP | 1094956 | B1 | 5/2001 | |
| EP | 1428691 | A1 | 6/2004 | |
| EP | 1982849 | A1 * | 10/2008 | B60C 13/002 |
| EP | 1982849 | A1 | 10/2008 | |
| JP | H1071807 | | 3/1998 | |
| JP | 4559624 | | 10/2010 | |
| WO | 0001543 | A1 | 1/2000 | |
| WO | 0001544 | | 1/2000 | |
| WO | 0046047 | A1 | 8/2000 | |
| WO | 0102195 | | 1/2001 | |
| WO | WO-2005044546 | A1 * | 5/2005 | B60C 17/0009 |
| WO | 2006071229 | | 7/2006 | |
| WO | 2009080587 | | 7/2009 | |
| WO | 2009103733 | | 8/2009 | |
| WO | 2014105813 | | 7/2014 | |

OTHER PUBLICATIONS

English Machine Translation of WO2005044546 (Year: 2005).*
Carneiro Joaquim, European Search Report, dated Jul. 6, 2018, European Patent Office, Munich Germany.
Carneiro Joaquim, European Search Report Opinion, dated Jul. 6, 2018, European Patent Office, Munich Germany.
Machine translation of EP1982849A1, filed Feb. 19, 2008, Continental Aktiengesellschaft.
English Abstract of CN1107601C, dated May 7, 2003.
English Abstract of CN1265067A, dated Aug. 30, 2000.
English Abstract of CN1438944A, dated Aug. 27, 2003.
English Abstract of CN1900399A, dated Jan. 24, 2007.
English Abstract of CN101077683A, dated Nov. 28, 2007.
English Abstract of CN101678716B, dated Nov. 30, 2011.
English Abstract of CN102216093A, dated Oct. 12, 2011.
English Abstract of JP4559624B2, dated Oct. 13, 2010.
English Abstract of JPH1071807A, dated Mar. 17, 1998.
Tire Section 1, undated, admitted prior art.
Tire Section 2, undated, admitted prior art.
Tire Section 3, undated, admitted prior art.

* cited by examiner

US 10,894,448 B2

RUNFLAT TIRE WITH SIDEWALL-REINFORCING INSERTS

FIELD OF THE INVENTION

The present invention relates generally to a run-flat tire and more particularly relates to a run-flat tire with sidewall-reinforcing inserts having a fabric barrier.

BACKGROUND OF THE INVENTION

It is well-known that automobile tires are provided in run-flat configurations. Run-flat tires are used by automobile manufacturers to eliminate the need for spare tires, thereby increasing available space within a vehicle and reducing vehicle curb weight. Many vehicle operators prefer the convenience of a run-flat tire because it is able to continue operating even under loss of inflation pressure. Run-flat tires are designed to be able to function for a limited time and distance at zero inflation pressure, also referred to in the art as a "zero (0) psi state."

Conventional run-flat tires may include a reinforced sidewall area to support a load in the zero psi state. Some conventional run-flat tires are supported in the zero psi state by a sidewall-reinforcing insert made of a high durometer rubber. While functioning in the zero psi state, eventually the stress of bearing a vehicle load without tire inflation pressure results in a horizontal crack or slit through the sidewall-reinforcing insert. The horizontal slit extends across the thickness of the insert from a bottom to a top of the insert in a substantially straight line. Eventually the slit extends across the entire thickness of the insert resulting in a failure condition, rendering the run-flat tire non-functional for its intended purpose.

There is an ongoing effort in the tire industry to construct more durable run-flat tires that can function in a zero psi state for longer periods of time and over longer distances. Some run-flat tire designs directed to increasing run-flat durability include increasing the thickness of the insert; however, this has the disadvantage of increasing the run-flat tire weight and size. Additionally, increasing the amount of rubber to reinforce the sidewalls can contribute to heat build-up, which is a contributing factor to tire failure.

A number of run-flat tire designs to increase run-flat durability include a large number of additional components when compared to tires without reinforced sidewalls. These additional components increase the complexity of the tire design and the tire assembly process, resulting in increased production time and increased costs. Many of the sidewall reinforcing components are integrated into other regions of the tire and may affect other non-sidewall-reinforcing components of the tire, which, in some cases, may affect certain aspects of the overall performance of the tire. For example, some components may extend from one bead portion through the tread region and to the opposing bead portion. Such configurations further increase the complexity of the tire design and tire assembly process, thereby resulting in more time delays and further costs.

Therefore, a need exists to overcome the problems with the prior art as discussed above.

SUMMARY OF THE INVENTION

The invention provides a run-flat tire with sidewall-reinforcing inserts that overcomes the hereinafore-mentioned disadvantages of the heretofore-known devices and methods of this general type and that provide an improved run-flat tire that increases run-flat durability in the zero psi state, without increasing a complexity of the tire design and with very little change to current production processes.

With the foregoing and other objects in view, there is provided, in accordance with the invention, a run-flat tire having a tread; an inner liner disposed beneath the tread; a first sidewall region including a first sidewall, and a second sidewall region including a second sidewall, each of the first and second sidewalls axially spaced apart from one another and extending from the respective first and second ends of the tread; and a first bead portion and a second bead portion axially spaced apart from one another, each bead portion having a bead core and a bead filler. The run-flat tire further includes at least one body ply having a main body ply portion extending circumferentially about the tire, at least a portion of the main body ply portion disposed between the tread and the inner liner; and having a first turned-up portion and a second turned-up portion, the first turned-up portion looping around the first bead portion and the second turned-up portion looping around the second bead portion. A pair of sidewall-reinforcing portions is each disposed in respective sidewall regions of the run-flat tire. Each of the pair of sidewall-reinforcing portions includes a fabric barrier; a first sidewall-reinforcing insert disposed within a respective sidewall region between the fabric barrier and the inner liner; and a second sidewall-reinforcing insert disposed within a respective sidewall region between the fabric barrier and the body ply. The fabric barrier is disposed between the first and the second insert and extends not more than an entire length of at least one of the first and second insert.

In accordance with another feature of the present invention, the fabric barrier extends substantially an entire length of at least one of the first and second sidewall-reinforcing inserts.

In accordance with a further feature of the present invention, the first turned-up portion has a first end; the second turned-up portion has a second end, opposite the first end of the first-turned up portion; and each of the first and second ends terminate in a respective sidewall region and contact a surface of the body ply after looping around the respective bead portion.

In accordance with a further feature of the present invention, the first sidewall-reinforcing insert is crescent-shaped and of a rubber material and the second sidewall-reinforcing insert is crescent-shaped and of a rubber material.

In accordance with a further feature of the present invention, the second edge of the fabric barrier is spaced apart from the bead filler of a corresponding bead portion.

In accordance with another feature of the present invention, a distance at which the second edge of the fabric barrier is spaced apart from the bead filler of the corresponding bead portion is defined by a thickness of the body ply.

In accordance with yet another feature of the present invention, the fabric barrier does not extend beyond the respective sidewall region.

In accordance with a further feature of the present invention, the body ply extends continuously from the first bead portion to the second bead portion.

In accordance with another feature of the present invention, the fabric barrier includes parallel polymer cords.

In accordance with yet another feature of the present invention, the parallel polymer cords include elongated parallel cords of polyester.

In accordance with another feature of the present invention, the first sidewall-reinforcing insert includes a first sidewall-facing surface and a second surface opposite the first sidewall-facing surface, the first sidewall-facing surface of the first sidewall-reinforcing insert contacting the fabric barrier and the second surface of the first sidewall-reinforcing insert contacting the inner liner.

In accordance with another feature of the present invention, the second sidewall-reinforcing insert includes a first sidewall-facing surface and a second surface opposite the first sidewall-facing surface, the first sidewall-facing surface of the second sidewall-reinforcing insert contacting the body ply and the second surface of the second sidewall-reinforcing insert contacting the fabric barrier.

In accordance with a further feature of the present invention, the run-flat tire further includes at least one belt disposed between the tread and the body ply and the first edge of the fabric barrier is in an overlapping configuration with a corresponding end of the belt.

In accordance with yet another feature of the present invention, the fabric barrier includes parallel cords oriented at a bias angle of between about 25 degrees and 65 degrees.

In accordance with a further feature of the present invention, the fabric barrier includes parallel cords oriented at a bias angle of at least about 45 degrees.

In accordance with yet a further feature of the present invention, the fabric barrier includes a maximum thickness of about 0.044 inches.

In accordance with another feature of the present invention, each of the first and second sidewall-reinforcing inserts includes a maximum thickness of about 0.18 inches.

In accordance with yet another feature of the present invention, each of the first and second sidewall-reinforcing inserts includes a maximum thickness of no more than 0.20 inches.

In accordance with a further feature of the present invention, each of the first and second sidewall-reinforcing inserts tapers outwardly toward opposing edges from a maximum thickness of about 0.18 inches to a minimum thickness of about 0.02 inches.

In accordance with yet a further feature, an embodiment of the present invention includes a run-flat tire with a tread having a first end and a second end, opposite the first end; an inner liner disposed beneath the tread; and a first sidewall region including a first sidewall, and a second sidewall region including a second sidewall, each of the first and second sidewalls axially spaced apart from one another and extending from the respective first and second ends of the tread. The run-flat tire further includes a first bead portion and a second bead portion axially spaced apart from one another, each bead portion having a bead core and a bead filler; and at least one body ply having a main body ply portion extending circumferentially about the tire and disposed between the tread and the inner liner; and having a first turned-up portion and a second turned-up portion, the first turned-up portion looping around the first bead portion and the second turned-up portion looping around the second bead portion. A pair of sidewall-reinforcing portions is disposed in respective sidewall regions. Each of the pair of sidewall-reinforcing portions has a fabric barrier including elongated parallel polymer cords; a first sidewall-reinforcing rubber insert disposed within a respective sidewall region between the fabric barrier and the inner liner; and a second sidewall-reinforcing rubber insert disposed within a respective sidewall region between the fabric barrier and the body ply. The fabric barrier is disposed between the first and the second sidewall-reinforcing inserts and the fabric barrier extends not more than an entire length of the first and second sidewall-reinforcing inserts.

Although the invention is illustrated and described herein as embodied in a run-flat tire with sidewall-reinforcing inserts, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

As used herein, the terms "axial" and "axially" is intended to indicate lines or directions that are parallel to the axis of rotation of the tire. The terms "radial" and "radially" are defined as lines or directions radially toward or away from the axis of rotation of the tire. "Circumferential," as used herein, is intended to indicate circular lines or directions extending along the perimeter of the surface of the annular tread perpendicular to the axial direction. The term "equatorial plane" (EP) is intended to indicate a plane perpendicular to the tire's axis of rotation and passing through the center of the tread. The acronym "psi" stands for pounds per square inch. "Normal inflation pressure," as used herein, is defined as the specific design inflation pressure at a specified load assigned by the appropriate standards organization for the service condition for the tire. "Normal load," as used herein, is intended to indicate the specific design inflation pressure and load assigned by the appropriate standards organization for the service condition for the tire. "Section height" (SH) means the radial distance from the nominal rim diameter to the outer diameter of the tire at its equatorial plane.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
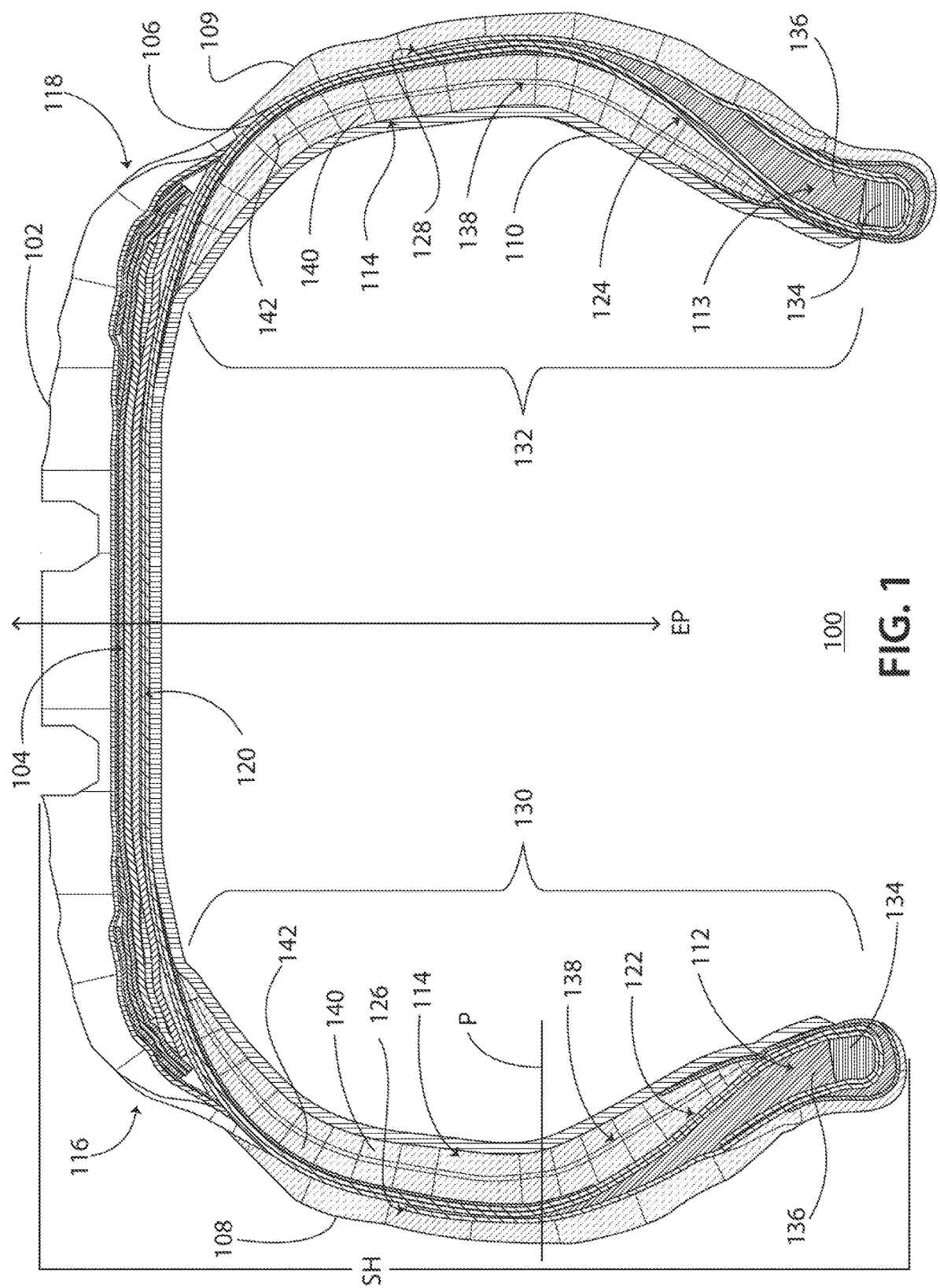
FIG. 1 is a partial cross-sectional view of an embodiment of a run-flat tire in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient run-flat tire with an improved sidewall-reinforcing insert that divides a standard-sized sidewall-reinforcing insert into two smaller, separate sidewall-reinforcing inserts with a fabric barrier interposed therebetween. The fabric barrier diverts a horizontal tear that normally travels through a thickness of the standard-sized insert from one surface to the opposing surface, so as to prolong the functional life of the run-flat tire in an uninflated or underinflated state. In other words, when the run-flat tire is functioning in a zero psi state, the horizontal tear is redirected through the fabric barrier, thereby allowing the tire more cycle life, without adding much weight to current run-flat tires with standard-sized inserts and with very little change to current run-flat tire production processes. Embodiments of the invention provide a fabric barrier made of parallel-aligned polymer cords oriented at a bias angle of approximately 45 degrees. In addition, embodiments of the invention provide a 0.044 gauge polyester fabric, similar to body ply fabric. Furthermore, embodiments of the invention include a fabric barrier that extends between the two inserts and along substantially an entire length of the inserts, but no more than the length of the insert. This provides the advantage that the fabric barrier is considered a component independent of the body of the tire, thereby not being associated with the tire cycling process. In other words, the fabric barrier provides no other mechanical function than to redirect the tear to prolong the tire life in the zero psi state.

Referring now to FIG. 1, one embodiment of the present invention is shown in a partial cross-sectional view. FIG. 1 shows several advantageous features of the present invention, but, as will be described below, the invention can be provided in several shapes, sizes, combinations of features and components, and varying numbers and functions of the components. The first example of a run-flat tire 100, as shown in FIG. 1, includes a tread 102, a belt structure 104, a body ply 106, a first and second sidewall 108 and 109, an inner liner 110, a first and second bead portion 112 and 113, and a pair of sidewall-reinforcing portions 114.

The tread 102 includes a first end 116 and a second end 118 opposite the first end 116. The tread 102 is a rubber compound on an outer portion of the run-flat tire 100 that comes into contact with a ground surface. In other words, "tread" refers to the portion of the tire that comes into contact with the road under a normal load. The tread 102 provides the grip or traction required for driving, braking, and cornering. The tread 102 may include one or more grooves, lugs, voids, and/or sipes that define the geometrical shape of the tread 102.

The belt structure 104 can include at least one belt 104, preferably at least two belts 104. In one embodiment, the belt structure 104 is disposed radially outward of the body ply 106 and radially inward of the tread 102. Stated another way, the belt structure 104 is disposed between the tread 102 and the body ply 106. In another embodiment, the belt structure 104 includes two steel belt plies, each belt ply including steel parallel cords oriented at opposite angles to one another and disposed directly on top of the body ply 106. The belt structure 104 is also commonly referred to as "stabilizer plies." The belt structure 104, i.e. stabilizer plies, is operably configured to restrict expansion of the body ply 106 cords, stabilize the tread area, and provide impact resistance. In one embodiment, the belt structure 104 is made of materials other than steel. In yet another embodiment, the belt structure 104 is made with three or more belt plies. In a further embodiment, the belt structure 104 is made of woven materials, instead of parallel-aligned cords. As used herein, the term "cord" is intended to indicate reinforcement strands of which the plies of a tire, and other components of a tire, are comprised of. The term "ply" is intended to indicate a layer with parallel cords.

In one embodiment, the run-flat tire 100 includes a single body ply 106. In further embodiments, the run-flat tire 100 can include two or more body plies 106. In yet another embodiment, the body ply 106 extends continuously from the first bead portion 112 to the second bead portion 113. The body ply 106 is configured to provide strength to contain the air pressure and provide for sidewall impact resistance. In one embodiment, the body ply 106 includes parallel cords encapsulated in a rubber coating, also referred to in the art as "body ply skim." In another embodiment, the body ply 106 extends radially across the run-flat tire 100, wrapping around each of the first and second bead portions 112, 113. Stated another way, the body ply 106 can be seen as including a main body ply portion 120, a first turned-up portion 122, and a second turned-up portion 124, each of the turned-up portions 122, 124 extending from opposing ends of the main body ply portion 120. The main body ply portion 120 can extend circumferentially about the run-flat tire 100 in a continuous manner. In one embodiment, the main body ply portion 120 is disposed between the tread 102 and the inner liner 110. More particularly, at least a portion of the main body ply portion 120 can be disposed directly between the belt structure 104 and the inner liner 110, where the belt structure 104 is disposed radially outward of the main body ply portion 120 and the inner liner 110 is disposed radially inward of the main body ply portion 120. In some embodiments, cords of the body ply 106 may be made from, for example, polyester, nylon, rayon, steel, aramid, fiberglass, or any other suitable metal or textile.

In one embodiment, each of the first 122 and second turned-up portions 124 loops around the corresponding bead portion 112, 113, respectively. In another embodiment, the first turned-up portion 122 includes a first turned-up portion end 126 and the second turned-up portion 124 includes a second turned-up portion end 128, opposite the first turned-up portion end 126. Stated another way, the first turned-up portion end 126 and the second turned-up portion end 128 can be considered opposite edges of the body ply 106. In one embodiment, each of the first turned-up portion end 126 and the second turned-up portion end 128 terminates in a respective first and second sidewall region 130, 132. In another embodiment, each of the first turned-up portion end 126 and the second turned-up portion end 128 contacts a surface of the body ply 106 after looping around the respective bead portion 112, 113. In a further embodiment, each of the first turned-up portion end 126 and the second turned-up portion end 128 contacts a radially outer surface of the body ply 106 after looping around the respective bead portion 112, 113. In yet a further embodiment, the first turned-up portion 122 can be said to loop around the first bead portion 112 in a clockwise direction, while the second turned-up portion 124 loops around the second bead portion 113 in a counter-clockwise direction. As used herein, the term "contact" is intended to indicate a direct physical contact or touching of objects or surfaces. As used herein, the "sidewall region" indicates the area of a tire between the tread and the bead core.

In one embodiment, the first sidewall region 130 includes the first sidewall 108 and the second sidewall region 132 includes the second sidewall 109. In another embodiment, each of the first and second sidewalls 108, 109 is axially spaced apart from one another and extends from respective first and second ends 116, 118 of the tread 102. Each sidewall 108, 109 can be said to extend from the respective bead portion 112, 113 to the respective tread end 116, 118. In a preferred embodiment, the sidewalls 108, 109 are made of a rubber material and are configured to protect the body ply 106 from abrasion, impact, and flex fatigue. In some embodiments, a radially outward surface of each the sidewalls 108, 109 is exposed to and viewable from the outside environment and may also carry decorative treatments, including white or colored stripes or letters. Sidewall rubber compounds can be formulated to resist cracking due to environmental hazards, such as ozone, oxygen, UV radiation, and heat.

The inner liner 110 is disposed beneath the tread 102. Said another way, the inner liner 110 is disposed radially inward of the tread 102. The "inner liner," as used herein, is intended to indicate a layer that forms an inner peripheral surface of a tubeless tire. In one embodiment, the inner liner 110 is a relatively thin, layer of elastomer, specially formulated to improve air retention by lowering permeation of air outwards through the tire 100. In other embodiments, the inner liner 110 may be made of a different material. In yet other embodiments, the inner liner 110 is the inner-most layer of the tire 100.

In one embodiment, each of the pair of bead portions 112 is axially spaced apart from one another. In another embodiment, each of the pair of bead portions 112 includes a bead core 134 and a bead filler 136. In some embodiments, the bead core 134 can be considered the portion of the tire that engages a rim on a wheel. In one embodiment, the bead core 134 includes individual bronze plated bead wires that are rubber coated and wound into a bundle of bead wires of a specified diameter and configuration, anchoring an inflated tire to a wheel rim. In some embodiments, the bead wire may be carbon steel wire. In other embodiments, the bead wire may be made of other metal materials. In another embodiment, the bead core 134 can be considered an annular inextensible member, holding a tire to the rim and being wrapped around by one or more body plies 106.

The bead filler 136, also known in the art as the apex, can be applied on top of the bead core 134 to fill a cavity formed between a radially inward portion of the body ply 106 and respective ends 126, 128 of the turned-up portions of the body ply 106. In a preferred embodiment, the bead filler 136 is of a rubber material and may be formed so as to have a triangular cross-sectional shape. In some embodiments, the bead filler 136 is of a high durometer rubber material. In other embodiments, the bead filler 136 may include a low durometer rubber material. In yet other embodiments, the bead filler 136 may terminate within a plane (P) that lies in a central portion of the sidewall region 130. As used herein, the term "central portion" is intended to indicate a middle section of a sidewall region between a top section and a bottom section of the sidewall region, where the middle section, the top section, and the bottom section are each one-third sections of the sidewall region. In yet another embodiment, the bead filler 136 extends radially from the bead core 134 to a distance of no more than 60% of the section height. In yet another embodiment, the bead filler 136 extends radially from the bead core 134 to a distance of no more than 50% of the section height. In yet a further embodiment, the bead filler 136 can be said to terminate at or beneath a plane that lies at a point about midway between the bead core 134 and the respective tread end 116, 118. Varying the bead filler height and hardness can affect the tire's 100 ride and handling properties and may impact sidewall stiffness.

The pair of sidewall-reinforcing portions 114 are each disposed within respective sidewall regions 130, 132 of the run-flat tire 100. Each of the pair of sidewall-reinforcing portions 114 includes a barrier fabric 138, a first sidewall-reinforcing insert 140, and a second sidewall-reinforcing insert 142. The term "insert" is used herein as a shortened form of the term "sidewall-reinforcing insert." The inserts 140, 142 are shaped and sized to help support the sidewalls 108, 109 and the load when the inflation pressure is low or zero. Preferably, each of the sidewall-reinforcing portions 114 include two sidewall-reinforcing inserts 140, 142. The addition of a third or more sidewall-reinforcing inserts may increase the complexity and overall weight of the run-flat tire 100, which could increase costs and production time. That said, some embodiments may include three or more inserts.

In one embodiment, the inserts 140, 142 are preferably crescent-shaped. The term "crescent-shaped," as used herein, is defined as a sidewall-reinforcing insert resembling a crescent shape and includes wedge-shaped inserts. In other embodiments, the inserts 140, 142 are provided in a variety of other shapes known in the art. In a preferred embodiment, the inserts 140, 142 are of a rubber compound. In one embodiment, the inserts 140, 142 are of a natural rubber. In another embodiment, the inserts 140, 142 are of a synthetic rubber. In another embodiment, the inserts 140, 142 include non-rubber materials. In yet another embodiment, the inserts 140, 142 are cord-reinforced with, for example, short fibers. In a further embodiment, the inserts 140, 142 are of a high durometer rubber. In yet a further embodiment, the inserts 140, 142 include a low durometer rubber. In a preferred embodiment, each of the inserts 140 and 142 are of the same rubber compound and/or have the same durometer measurement or hardness as the other insert 140 and 142. Accordingly, the number of polymer compounds used in manufacture of the run-flat tire 100 can be reduced and, therefore, the cost of manufacture.

The inserts 140, 142 are preferably made of an elastomeric material, such as rubber, having a high degree of hardness/stiffness, yet a low hysteresis. The hysteresis of the elastomeric material is a measure of its tendency to generate internal heat under flexing service conditions. As is known in the art, hysteresis is a term for heat energy expended in a material (e.g., cured rubber composition) by applied work. Generally, a rubber or elastomeric material having a lower hysteresis generates less internal heat under service conditions than an otherwise comparable elastomeric or rubber with a substantially higher hysteresis. Thus, a relatively low hysteresis is desired for the rubber composition of the inserts 140, 142 because the tire's 100 life can be improved, especially during operation in a zero psi state. In one embodiment, the rubber compound of the inserts 140, 142 is the same or substantially similar to the rubber compound of the bead filler 136, differing only with respect to the shape and placement within the tire 100.

The fabric barrier 138 can be considered a "barrier" between the inserts 140, 142. In one embodiment, the fabric barrier 138 includes a plurality of polymer cords, such as nylon, rayon, or aramid cords. In a preferred embodiment, the fabric barrier 138 includes a plurality of polyester cords. More preferably, the polymer cords are oriented parallel to one another. In a further embodiment, the polymer cords of the fabric barrier 138 can be considered elongated parallel cords. In one embodiment, the polymer cords of the fabric barrier 138 may be coated with a layer of rubber. In yet further embodiments, the fabric barrier 138 includes woven fabric with two or more sets of parallel elongated fabric strands interlaced at right angles to each other. In one embodiment, the fabric barrier 138 includes parallel cords oriented at a bias angle of between about 25 degrees to about 65 degrees with respect to the equatorial plane of the run-flat tire 100. In a preferred embodiment, the fabric barrier 138 includes parallel cords oriented at a bias angle of about 45 degrees with respect to the equatorial plane of the run-flat tire 100. In another embodiment, the fabric barrier 138 includes parallel cords oriented at a bias angle of at least 45 degrees. In one embodiment, the fabric barrier 138 is of the same material and/or is constructed the same as or similar to body ply fabric.

In one embodiment, the fabric barrier 138 is disposed between the first and second sidewall-reinforcing inserts 140 and 142. In another embodiment, at least a portion of the first sidewall-reinforcing insert 140 is disposed within a respective first sidewall region 130 or 132 between the fabric barrier 138 and the inner liner 110. In a preferred embodiment, the first sidewall-reinforcing insert 140 is disposed directly between the fabric barrier 138 and the inner liner 110. In other words, the first sidewall-reinforcing insert 140 can be said to include a first sidewall-facing surface and a second surface opposite the first sidewall-facing surface, where the first sidewall-facing surface contacts the fabric barrier 138 and the second surface contacts the inner liner 110.

In one embodiment, at least a portion of the second sidewall-reinforcing insert 142 is disposed within the respective sidewall region 130 or 132 between the fabric barrier 138 and the body ply 106. In a preferred embodiment, the second sidewall-reinforcing insert 142 is disposed directly between the fabric barrier 138 and the body ply 106. In other words, the second sidewall-reinforcing insert 142 can be said to include a first sidewall-facing surface and a second surface opposite the first sidewall-facing surface, where the first sidewall-facing surface contacts the body ply 106 and the second surface contacts the fabric barrier 138.

Figure 2:
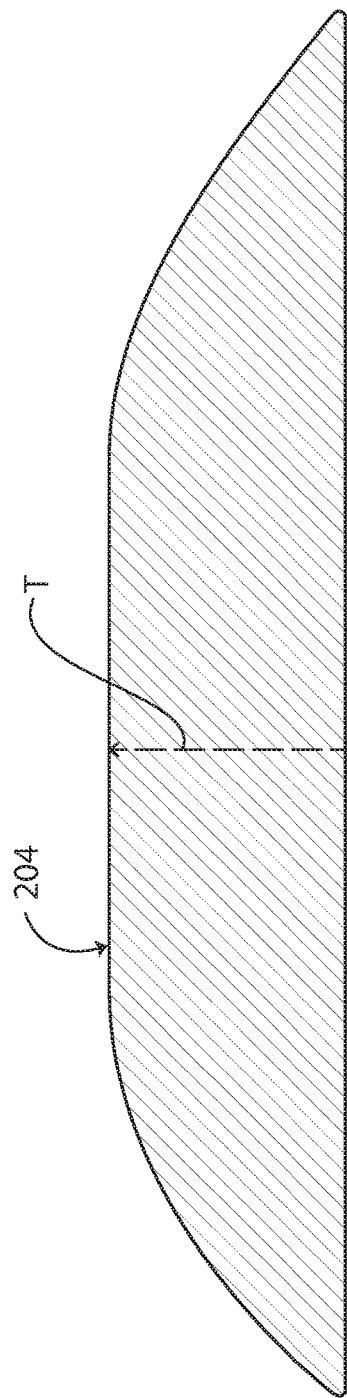
FIG. 2 is a cross-sectional view of a prior art sidewall-reinforcing insert.
Figure 3:
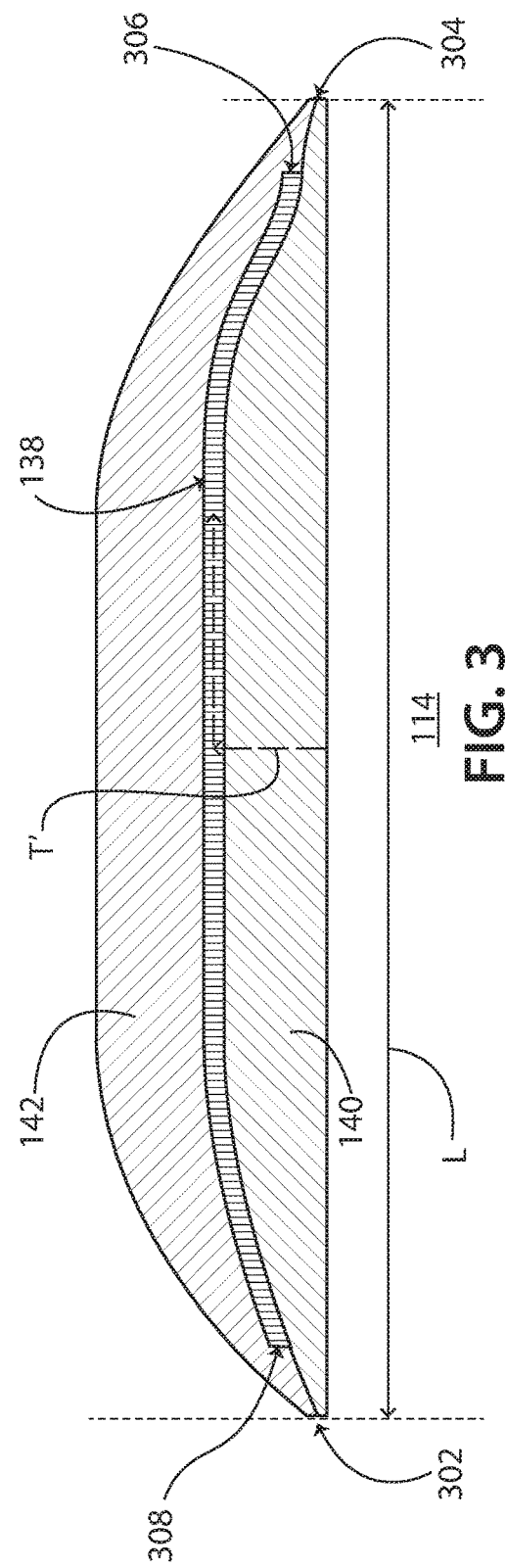
FIG. 3 is a cross-sectional view of an embodiment of a sidewall-reinforcing insert divided by a fabric barrier in accordance with the present invention.

In one embodiment, the fabric barrier 138 extends substantially an entire length (L) of either of the first and second inserts 140, 142, where the length (L) is defined as a distance between a first edge 302 and a second edge 304 of either of the first and second inserts 140, 142 (see FIG. 3). In a preferred embodiment, the length (L) of each of the inserts 140, 142 is substantially the same. As used herein, the term "substantially an entire length" is defined as at least 75% of said entire length of an object. In another embodiment, the fabric barrier 138 extends not more than the entire length (L) of either of the first and second inserts 140, 142. This provides the advantage that the fabric barrier 138 can be considered a component independent of the body of the tire 100, thereby not being associated with the tire cycling process. In other words, in the preferred embodiment, the fabric barrier 138 provides no other mechanical function to the tire 100 than to redirect a horizontal tear (T) (see FIGS. 2 and 3) resulting from stresses in the zero psi state in order to prolong the tire life in the zero psi state. In yet another embodiment, the fabric barrier 138 does not extend beyond the respective sidewall region 130, 132. Stated another way, the fabric barrier 138 is restricted to the respective sidewall region 130 or 132 so as not to extend into or contact other regions of the tire, particularly the tread area, which typically includes the area defined by the tread 102, the belt structure 104, and the portion of the inner liner 110 directly beneath the tread 102. Accordingly, the fabric barrier 138 can be isolated from non-sidewall regions of the tire 100 so as to provide no other mechanical function than to redirect the horizontal tear (T) to prolong tire life in the zero psi state.

Referring now primarily to FIGS. 1 and 3, the fabric barrier 138 can be said to include a first edge 306 and a second edge 308 opposite the first edge 306. In one embodiment, the first edge 306 terminates just beneath the respective end 116 or 118 of the tread 102. Stated another way, the first edge 306 of the fabric barrier 138 is in an overlapping configuration with a corresponding end of the belt structure 104. In another embodiment, the second edge 308 terminates proximate the respective bead portion 112 or 113. In yet another embodiment, the second edge 308 is spaced apart a distance from the bead filler 136 of the corresponding bead portion 112 or 113. Stated another way, the second edge 308 is disposed a non-zero distance from the bead filler 136. The "corresponding bead portion" of a fabric barrier is defined herein as the bead portion most proximate to said fabric barrier and within the same sidewall region of said fabric barrier. As used herein, the term "edge" is defined as an absolute end of an object. In a further embodiment, the distance at which the second edge 308 is spaced apart from the corresponding bead filler portion 112 or 113 is defined by a thickness of the one or more body plies 106 wrapped around the corresponding bead filler portion 112 or 113.

Referring now primarily to FIGS. 2-3, advantageous features of the present invention are illustrated with a comparison of partial cross-sectional views of a prior art sidewall-reinforcing insert 200 (shown in FIG. 2) and the sidewall-reinforcing portion 114 of an embodiment of the present invention (shown in FIG. 3). During a zero psi state, the prior art insert 200 will eventually result in a substantially linear crack extending from a first surface 202 of the insert 200 to a second surface 204 of the insert 200 (opposite the first surface 202). Completion of the horizontal crack or tear, T, from the first surface 202 to the second surface 204 results in a failure condition of the tire.

In contrast, the sidewall-reinforcing portion 114 redirects the horizontal crack or tear, T', so as to run along a length of the fabric barrier 138, thereby extending the tire's functional life in the zero psi state. Advantageously, the fabric barrier 138 of the present invention is able to extend a tire's functional life in the zero psi state without adding much weight to current run-flat tires with standard-sized inserts and with very little change to current run-flat tire production processes. The fabric barrier 138 can be said to divide a standard-sized insert into two substantially equal-sized, smaller inserts.

In one embodiment, during the tire manufacture process, each of the elements of the sidewall-reinforcing portion 114 can be individually applied at a tire building machine (TAM) as three separate elements, i.e. the fabric barrier 138 and the inserts 140 and 142. In a preferred embodiment, the elements of the sidewall-reinforcing portion 114 are applied on the inner liner 110 using the recessed run-flat building drum, disclosed by U.S. Pat. No. 6,488,797, incorporated herein by reference. In an alternative embodiment, each of the three elements of the sidewall-reinforcing portion 114 can be pre-assembled, prior to placement on the drum. Such tire manufacturing processes is not much of a deviation from current run-flat tire assembly processes where sidewall-reinforcing inserts are installed. More particularly, current run-flat tire assembly processes include applying a standard-sized insert to the drum, whereas, in the present invention said process would include an additional step of pre-assembling the elements of the sidewall-reinforcing portion 114, or two additional steps of applying one more insert and a fabric barrier.

Figure 4:
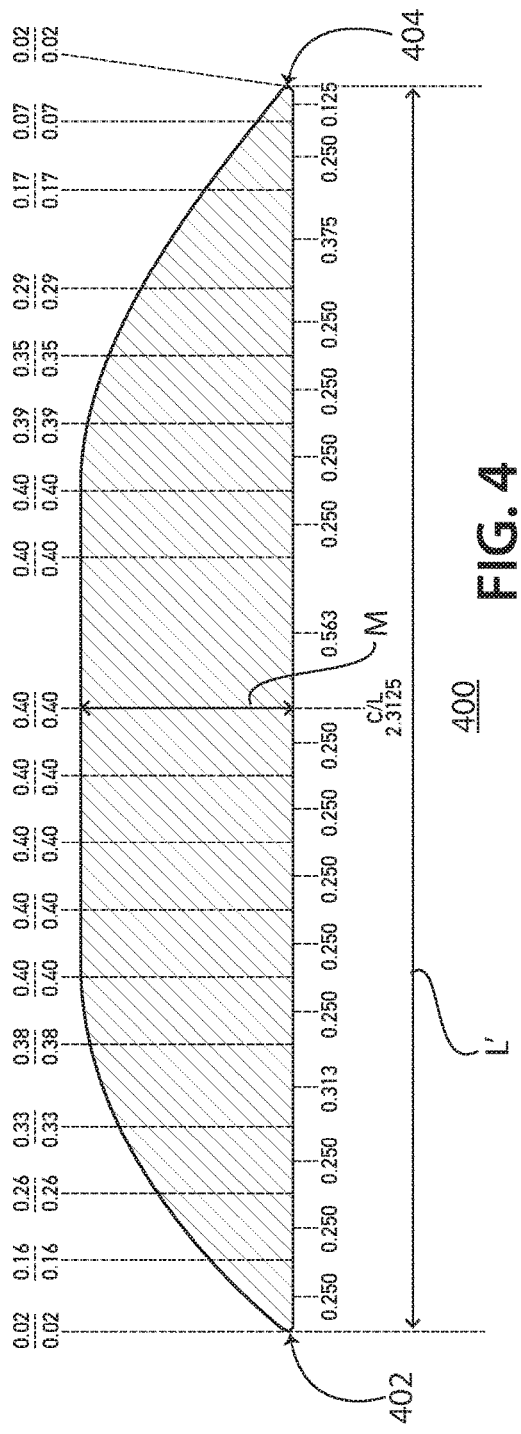
FIG. 4 is a cross-sectional view of the prior art sidewall-reinforcing insert of FIG. 2 including an exemplary set of dimensions.
Figure 5:
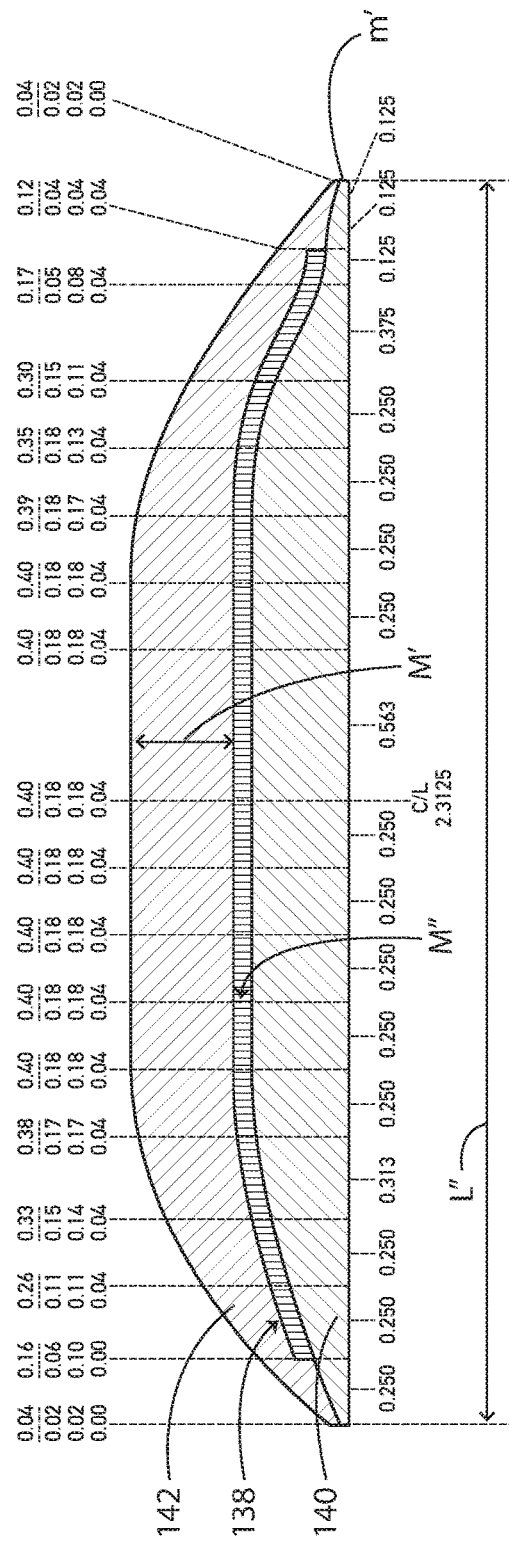
FIG. 5 is a cross-sectional view of the sidewall-reinforcing insert of FIG. 3 including an exemplary set of dimensions.

Referring primarily to FIGS. 4-5, a standard-sized insert 400 is compared to an improved insert, i.e. the sidewall-reinforcing portion 114 of the present invention. Dimensions of the standard-sized insert 400 are provided in FIG. 4. In the exemplary embodiment, the standard-sized insert 400 includes a maximum thickness (M) of 0.40 inches. The standard-sized insert 400 can taper toward the edges from 0.38 inches down to 0.02 inches, as in the illustrative embodiment. In one embodiment, the standard-sized insert 400 includes a length, L', of about 4.626 inches, where the length is defined as a distance from one edge 402 to an opposing edge 404. The markings on the bottom of the standard-sized insert 400 indicate length, while the measurements above the top of the standard-sized insert 400 indicate width of the insert 400.

Dimensions of the sidewall-reinforcing portion 114 are provided in FIG. 5 in accordance with an embodiment of the present invention. As with FIG. 4, the markings on the bottom indicate length, while the measurements above the top of the insert 142 indicate width in FIG. 5. More particularly, the top-most measurement indicates total width, while the three measurements below indicate (from top to bottom) width of the insert 142, the insert 140, and the fabric barrier 138, respectively.

In one embodiment, the length, L", of the sidewall-reinforcing portion 114, is about 4.626 inches. In another embodiment, the length, L", of the sidewall-reinforcing portion 114 is greater than or less than 4.626 inches. In a further embodiment, the length, L", of the sidewall-reinforcing portion 114, is no greater than 5 inches. In one embodiment, each of the first and second inserts 140, 142 include a maximum thickness, M', of about 0.18 inches. In another embodiment, each of the first and second inserts 140, 142 include a maximum thickness, M', of no more than about 0.20 inches. In yet another embodiment, each of the first and second inserts 140, 142 tapers outwardly toward opposing edges from a maximum thickness, M', of about 0.18 inches to a minimum thickness, m', of about 0.02 inches. In yet other embodiments, each of the first and second inserts 140, 142 includes a maximum thickness, M', outside of these ranges.

Dimensions of the fabric barrier 138 are provided in FIG. 5 in accordance with an embodiment of the present invention. In one embodiment, the fabric barrier 138 includes a maximum thickness, M", of about 0.044 inches. In one embodiment, the fabric barrier 138 includes a maximum thickness, M", of no more than 0.05 inches. In yet other embodiments, the fabric barrier 138 includes a maximum thickness, M", outside of these ranges. In a further embodiment, the fabric barrier 138 is uniformly thick along its length. In yet another embodiment, the fabric barrier 138 is about 0.050 inches less in length than the length, L", of the sidewall-reinforcing portion 114. In a further embodiment, the fabric barrier 138 is about 0.025 inches less, on either end of the fabric barrier 138, than the length, L", of the sidewall-reinforcing portion 114. In yet another embodiment, the fabric barrier 138 includes a length outside of these ranges.

A run-flat tire with an improved sidewall-reinforcing insert has been disclosed that divides a standard-sized sidewall-reinforcing insert into two smaller, separate sidewall-reinforcing inserts with a fabric barrier interposed therebetween. The fabric barrier diverts a linear tear that normally travels through a thickness of the standard-sized insert from one surface to the opposing surface, so as to prolong the functional life of the run-flat tire in an uninflated or under-inflated state, without adding much weight to current run-flat tires with standard-sized inserts and with very little change to current run-flat tire production processes.

What is claimed is:

1. A run-flat tire comprising:
    a tread;
    an inner liner disposed beneath the tread;
    a first sidewall region including a first sidewall, and a second sidewall region including a second sidewall, each of the first and second sidewalls axially spaced apart from one another and extending from the respective first and second ends of the tread;
    a first bead portion and a second bead portion axially spaced apart from one another, each bead portion having a bead core and a bead filler;
    at least one body ply:
        having a main body ply portion extending circumferentially about the tire, at least a portion of the main body ply portion disposed between the tread and the inner liner; and
        having a first turned-up portion and a second turned-up portion, the first turned-up portion looping around the first bead portion and the second turned-up portion looping around the second bead portion; and
    a pair of sidewall-reinforcing portions each disposed in respective sidewall regions and each having:
        a fabric barrier of parallel, biased cords, the fabric barrier disposed to divide a standard-sized insert into two equal-sized smaller inserts and the fabric barrier configured to redirect a horizontal tear resulting from stresses in a zero psi state along a length of the fabric barrier, the two equal-sized smaller inserts including;
a first sidewall-reinforcing insert disposed within a respective sidewall region between the fabric barrier and the inner liner; and
a second sidewall-reinforcing insert disposed within a respective sidewall region between the fabric barrier and the at least one body ply, the fabric barrier disposed directly between and contacting each the first and the second insert and extending not more than an entire length of either of the first and second insert.

2. The run-flat tire in accordance with claim 1, wherein: the fabric barrier extends substantially an entire length of at least one of the first and second sidewall-reinforcing inserts.

3. The run-flat tire in accordance with claim 1, wherein:
the first turned-up portion has a first end;
the second turned-up portion has a second end, opposite the first end of the first-turned up portion; and
each of the first and second ends terminate in a respective sidewall region and contact a surface of the at least one body ply after looping around the respective bead portion.

4. The run-flat tire in accordance with claim 1, wherein: the first sidewall-reinforcing insert is crescent-shaped and of a rubber material and the second sidewall-reinforcing insert is crescent-shaped and of a rubber material.

5. The run-flat tire in accordance with claim 1, wherein: a second edge of the fabric barrier is spaced apart from the bead filler of a corresponding bead portion.

6. The run-flat tire in accordance with claim 5, wherein: a distance at which the second edge of the fabric barrier is spaced apart from the bead filler of the corresponding bead portion is defined by a thickness of the at least one body ply.

7. The run-flat tire in accordance with claim 1, wherein: the fabric barrier does not extend beyond the respective sidewall region.

8. The run-flat tire in accordance with claim 1, wherein: the at least one body ply extends continuously from the first bead portion to the second bead portion.

9. The run-flat tire in accordance with claim 1, wherein: the parallel cords include parallel polymer cords.

10. The run-flat tire in accordance with claim 9, wherein: the parallel polymer cords include elongated parallel cords of polyester.

11. The run-flat tire in accordance with claim 1, wherein: the first sidewall-reinforcing insert includes a first sidewall-facing surface and a second surface opposite the first sidewall-facing surface, the first sidewall-facing surface of the first sidewall-reinforcing insert contacting the fabric barrier and the second surface of the first sidewall-reinforcing insert contacting the inner liner.

12. The run-flat tire in accordance with claim 1, wherein: the second sidewall-reinforcing insert includes a first sidewall-facing surface and a second surface opposite the first sidewall-facing surface, the first sidewall-facing surface of the second sidewall-reinforcing insert contacting the at least one body ply and the second surface of the second sidewall-reinforcing insert contacting the fabric barrier.

13. The run-flat tire in accordance with claim 1, further comprising:
at least one belt disposed between the tread and the body ply, a first edge of the fabric barrier in an overlapping configuration with a corresponding end of the at least one belt.

14. The run-flat tire in accordance with claim 1, wherein: the parallel cords are oriented at a bias angle of between about 25 degrees and 65 degrees.

15. The run-flat tire in accordance with claim 1, wherein: the parallel cords are oriented at a bias angle of at least about 45 degrees.

16. The run-flat tire in accordance with claim 1, wherein: the fabric barrier includes a maximum thickness of about 0.044 inches.

17. The run-flat tire in accordance with claim 1, wherein: each of the first and second sidewall-reinforcing inserts include a maximum thickness of about 0.18 inches.

18. The run-flat tire in accordance with claim 1, wherein: each of the first and second sidewall-reinforcing inserts include a maximum thickness of no more than 0.20 inches.

19. The run-flat tire in accordance with claim 1, wherein: each of the first and second sidewall-reinforcing inserts tapers outwardly toward opposing edges from a maximum thickness of about 0.18 inches to a minimum thickness of about 0.02 inches.

20. A run-flat tire comprising:
a tread having a first end and a second end, opposite the first end;
an inner liner disposed beneath the tread;
a first sidewall region including a first sidewall, and a second sidewall region including a second sidewall, each of the first and second sidewalls axially spaced apart from one another and extending from the respective first and second ends of the tread;
a first bead portion and a second bead portion axially spaced apart from one another, each bead portion having a bead core and a bead filler;
at least one body ply:
having a main body ply portion extending circumferentially about the tire and disposed between the tread and the inner liner; and
having a first turned-up portion and a second turned-up portion, the first turned-up portion looping around the first bead portion and the second turned-up portion looping around the second bead portion; and
a pair of sidewall-reinforcing portions each disposed in respective sidewall regions and each having:
a fabric barrier of parallel, biased cords, the fabric barrier disposed to divide a standard-sized insert into two equal-sized smaller inserts and the fabric barrier configured to redirect a horizontal tear resulting from stresses in a zero psi state along a length of the fabric barrier, the two equal-sized smaller inserts including;
a first sidewall-reinforcing rubber insert disposed within a respective sidewall region between the fabric barrier and the inner liner; and
a second sidewall-reinforcing rubber insert disposed within a respective sidewall region between the fabric barrier and the at least one body ply, the fabric barrier disposed directly between and contacting each the first and the second sidewall-reinforcing inserts and the fabric barrier extending not more than an entire length of either of the first and second sidewall-reinforcing inserts.

* * * * *